United States Patent [19]

White et al.

[11] Patent Number: 4,903,414

[45] Date of Patent: Feb. 27, 1990

[54] HIGH PRESSURE CONDITIONING SYSTEM

[75] Inventors: Richard L. White; Richard H. Diven, both of Dallas, Tex.; James H. Bleke, Wolcottville, Ind.

[73] Assignee: VE Holding Corp., Arlington, Tex.

[21] Appl. No.: 224,433

[22] Filed: Jul. 25, 1988

[51] Int. Cl.$^4$ .............................................. F26B 5/04
[52] U.S. Cl. ............................................ 34/15; 34/17; 34/60; 34/210; 34/217; 34/22
[58] Field of Search .................. 34/15, 17, 26, 31, 33, 34/46, 210, 212, 217, 22

[56] References Cited

U.S. PATENT DOCUMENTS

| | | | |
|---|---|---|---|
| 2,774,670 | 9/1953 | Albert | 99/2 |
| 3,993,796 | 11/1976 | Steinke | 426/630 |
| 4,205,094 | 5/1980 | Baird et al. | 426/459 |
| 4,371,556 | 2/1983 | Pitchon et al. | 426/311 |
| 4,391,839 | 7/1983 | Devenyi et al. | 426/626 |
| 4,450,176 | 5/1984 | Stahel | 426/2 |
| 4,664,905 | 5/1987 | Meyer | 426/2 |
| 4,667,418 | 5/1987 | White | 34/33 |
| 4,686,779 | 8/1987 | Wyatt et al. | 34/168 |
| 4,704,804 | 11/1987 | Wyatt et al. | 34/15 |
| 4,731,938 | 3/1988 | White | 34/33 |
| 4,817,518 | 4/1989 | Wyatt et al. | 99/516 |

*Primary Examiner*—Henry A. Bennet

*Attorney, Agent, or Firm*—Johnson & Gibbs

[57] ABSTRACT

A high pressure conditioning system apparatus and control network. A direct fired steam generator supplies a mixture of super-heated steam and oxygen-deficient non-condensable gases to a pressurized conditioner constructed for heating, mositurizing, and conditioning matter including cereals, grains, beans, full fat soybean, barley, and seeds for a selected period of time. The high pressure conditioner is adapted for homogeneous interaction of the direct fired steam, non-condensable gases and the matter to be conditioned. A pressurized resting chamber is used statically steam the conditioned matter. A myriad of chemical changes are advantageously induced by the utilization of high pressures, controlled time, temperature, direct fired steam, moisture content, and the homogeneous interaction thereof. The desirable chemical changes accomplished by the high pressure conditioner include partial denaturization of protein, eliminating or reduction of harmful enzymes and microorganisms, and insolubilizing certain polysaccharides encapsulating the starch in the grains. Such desirable chemical changes lead to better nutritive value of the feed produced. A dryer may also be disposed in flow communication with the system for drying and cooling and rendering stable the conditioned matter for subsequent handling.

36 Claims, 3 Drawing Sheets

FULL FAT SOYBEAN FLOUR STUDY

| SAMPLE | PERCENTAGE DRY BASIS | | | | UREASE INDEX, Δ pH |
|---|---|---|---|---|---|
| | DRY MATTER | FAT | PROTEIN | PEPSIN DIGESTIBILITY | |
| Rep. 1 Whole Soybeans #1 | 91.41 | 22.09 | 40.57 | - | 2.30 |
| Rep. 1 Whole Soybeans #2 | 90.80 | 15.64 | 40.64 | 91.9 | - |
| Rep. 2 Whole Soybeans #3 | 91.76 | 22.23 | 39.36 | - | 2.30 |
| Rep. 1 Ground Raw Soybeans #1 | 90.12 | 20.64 | 40.12 | - | 2.30 |
| Rep. 1 Ground Raw Soybeans #2 | 91.10 | 16.03 | 39.74 | 92.3 | - |
| Rep. 2 Ground Raw Soybeans #3 | 90.40 | 21.35 | 41.00 | - | 2.30 |
| Rep. 1 Treated Meal #1* | 79.04 | 20.87 | 41.02 | - | 0.12 |
| Rep. 1 Treated Meal #2* | 75.40 | 20.82 | 41.78 | 90.5 | - |
| Rep. 2 Treated Meal #3* | 78.28 | 20.72 | 41.34 | - | 0.12 |

\* About 2% by weight of water was added to the full fat soybean flour before the treatment. The resultant mixture was conditioned at about 100°C and about 1.5 atmospheric pressure in a dynamic conditioning vessel for about 5 minutes followed by a static treatment under similar conditions for about 12 minutes.

Rep. 1 and Rep. 2 denote two separate runs.

FIG. 2

COMPARATIVE DIGESTIBILITY AND UREASE INDICES

| Sample | Percentage Dry Basis | | | Urease Index, Δ pH |
|---|---|---|---|---|
| | Dry Matter | Moisture Content | Pepsin Digestibility | |
| Ground Raw Soybeans | 90.76 | 9.24 | 89.74 | 2.27 |
| Commercial Soybean Meal * | 88.84 | 11.16 | 97.05 | 0.06 |
| Treated Soybean Meal ** | 85.36 | 14.64*** | 90.09 | 0.06 |

\* Soybean meals available commercially.

\*\* Full-fat soybean flour was conditioned at about 100°C and about 1.5 atmospheric pressure in a dynamic conditioning vessel for about 5 minutes followed by a static treatement under similar conditions for about 12 minutes.

\*\*\* Before drying and cooling.

FIG. 3

BARLEY STUDY

| SAMPLE | DRY MATTER (%) | STARCH (%) | BETA-GLUCANS (%) | INSOLUBLE BETA-GLUCANS (%) | SOLUBLE BETA-GLUCANS (%) |
|---|---|---|---|---|---|
| Raw Barley* | 91.5 | 51.7 | 3.99 | 1.29 | 2.70 |
| Barley Treated** | 86.9 | 50.9 | 4.05 | 2.57 | 1.48 |

\* Ground raw barley.

\*\* Ground raw barley was conditioned at about 100°C and about 1.5 atmospheric pressure in a dynamic conditioning vessel for about 7 minutes.

FIG. 4

HIGH PRESSURE CONDITIONING SYSTEM

BACKGROUND OF THE INVENTION

The prior art is replete with conditioning systems for treating grain, ground grain, grain feed constituents and the like. Not the least of the prior art ground grain conditioning systems is the anaerobic pasteurizing conditioning system set forth and shown in U.S. Pat. Nos. 4,731,938 and 4,667,418 assigned to the assignee of the present invention and incorporated herein by reference. These systems are adapted for the anaerobic pasteurizing conditioning of grain and ingredients therefor adapted for livestock grain as well as other material. Such systems utilize the advantages of direct fired steam generation which include selectively saturated as well as super-heated steam and non-condensable gases generated therewith for the treatment of various substances.

Conditioning systems which are particularly adapted for the utilization of such direct fired steam are also available in the prior art as shown in U.S. Pat. No. 4,686,779, also assigned to the assignee of the present invention and incorporated herein by reference. Together these systems afford a considerable advance over earlier prior art systems in the treatment of many material substances, particularly livestock feed.

A common problem in prior art conditioning systems of grain, feed grains, vegetables and the like is the particular application of a system to a desired product. The utilization of soybeans has been addressed in a myriad of applications in prior art publications. Such applications are set forth and shown in U.S. Pat. Nos. 2,774,670; 3,993,796; 4,205,094; 4,371,556; 4,391,839; 4,450,176; and 4,664,905 which teach the treatment of soybeans and soybean meal. These systems do not incorporate the utilization of direct fired steam nor do they incorporate the utilization of homogeneous conditioning systems which permit the efficient utilization of the constituents of direct fired steam and the advantages thereof. Selective control of steam temperature, partial pressures and dew point in conditioning systems have only recently been recognized pursuant to various technical developments. Some of these are clearly manifested in the patents referenced above assigned to the assignee of the present invention and incorporated herein by reference. By properly utilizing these developments in the treatment of substances such as ground soybeans or barley, great advances may be achieved over the prior art. In discussing these advances, certain definitions will be necessary and are set forth below.

"Anaerobic" conditioning of matter, as referred to herein, comprises the broad step of exposing matter to a treatment fluid in an oxygen deficient environment. "Pasteurizing," as referred to herein, comprises the step of partial sterilization of a substance through temperature and exposure that kills or retards the growth of certain objectionable organisms, which includes the steps of anaerobic environmental exposure and/or elevated temperature exposure. Finally, "conditioning," as referred to herein, encompasses both anaerobic conditioning and pasteurization but also includes the step of exposing matter to various physical conditions and chemicals which react therewith. The rate of reaction approximately doubles for each increase in temperature of 10° C. These and other terms as defined herein have a direct bearing on the description of the present invention and the problems of the prior art which it overcomes.

The matter addressed herein although specifically recited as soybeans and barley may also be a composition of animal, mineral and/or vegetable products and it may be conditioned for direct use in feed, as well as for pelletizing, flaking, bagging and similar intermediate steps. More particularly, the matter addressed herein includes beans, cereals, seeds, grains, whole grains, feed grains, grain fractions, ground grain particulates, vegetables, meat, and trees (pulp/paper). Unfortunately, few (if any) prior art systems have addressed the technological intricacies of matter conversion through controlled time, temperature, moisture and pressurizing conditions. Few have addressed the chemical aspects of animal digestion and the effects of aerobic and anaerobic bacteria. It should be recognized that food prepared in an aerobic environment cannot be deposited in an anaerobic animal stomach with the expectation of maximum efficiency in conversion and protein bypass. Many of the same considerations can be included in the processing of cereals, seeds, grains, feed grains, vegetables, meat and raw material such as wood.

Prior art treatment fluids have generally been comprised of steam, gases and/or combinations thereof adapted for heating, cooling, moisturizing or drying and/or combinations thereof. In many instances the treatment fluid simply provides elevated heat to the matter for the high temperature variety of "pasteurizing" and killing certain heat sensitive organisms such as salmonella in feed. Unfortunately, this prior art step can also kill many useful organisms and denature amino acids as well as protein. As stated above, pasteurizing can also be effected by providing an anaerobic environment without the necessity of elevated temperatures. However, prior art systems generally use the treatment fluid heat to also attempt to alter the molecular structure of the matter prior to feeding or further processing. In one aspect, this is helpful in increasing solvation and the lubricity of the matter which is useful in subsequent operations such as compression and extrusion. The elevated "pasteurization" heat from the treatment fluid is therein also a source of energy in lieu of higher electromechanical energies which would otherwise be expended if a subsequent processing operation is required. Moisture generated in the particulate matter or deposited thereon by the treatment fluid then serves as a lubricant. It should be pointed out that the British Thermal Unit (BTU) content of conventional steam heat is generally solely a function of the steam volume due to the fact that external combustion boilers are typically used. One means of transferring heat from steam is through its condensation. These considerations have had widespread implications in the conditioning of matter throughout the prior art. Enthalpy levels are critical and when boiler steam is used the only means for adding enthalpy is with the steam. As discussed below for each temperature rise of 20° F., the free and bound moisture level of the particulate matter rises by about one percent. Many problems can develop from too high a moisture level including plugging of pelletizing dies when grain and such subsequent operations are involved.

The most important objective in conditioning many substances such as soybeans, barley, whole and ground grains should be, of course, the nutritive value of the matter and thus, the rate at which the matter can be converted and absorbed during digestion. For this reason excessively elevated heat and high moisture levels are not always the most appropriate pasteurizing or conditioning elements. These harsh conditions tend to destruct essential amino acids in the feed. "Chemical tempering" of the grain can also soften or break down the harder surface of the grain to facilitate digestion. Moreover, degradative microorganisms can be eliminated. Carbonic acid will attack such grain surfaces and the protein encapsulating the starch therein making the protein and starch more available for digestion. The availability of such chemical substances in elevated temperature processing could thus be seen to be extremely useful because the chemical reaction would be exponentially accelerated with temperature. Consequently, the nutritive value of the grain and its shelf-life further enhanced. Unfortunately, the prior art generally does not address such technological intricacies in grain conditioning.

Examples of the prior art processes and problems set forth above include conditioning systems for cooking and/or the heating and moisturizing of particulate matter, such as grain, mainly prior to pelletizing steps. This is but one illustration, and the prior art is replete with such systems. Many of these processes incorporate horizontal steam conditioning vessels and boiler steam heat exchanges. Usually, the flow volumes and retention times of the particulate matter passage with the boiler steam are considered the most critical operational parameters. Contact is thus made in a random fashion between the particles to be heated and the boiler steam within steam chambers. In the case of commercial grain treatment, steam from boilers is usually vented into the steam vessels through which various types of grain and microingredients are forced to travel. Steam injected into the vessel condenses on the grain therein for heating and moisturizing it to preselected conditions. As stated above, the BTU content of boiler steam is generally solely a function of the steam volume and the only means of transferring heat is through its condensation. Problems have thus arisen in the areas of proper cooking temperature, cooking environment, retention time, oxygen availability, homogeneity in treatment, as well as the steam generation itself. This is also true for the conditioning of particulate matter comprised of animal, mineral and/or vegetable products prior to feeding, bagging, compression, or extrusion processes. Both the immediate food value of the matter and its shelf-life are critical to the overall nutritive value of the product.

The prior art of steam vessels for both organic and inorganic material extends into technological antiquity with steam utilized for heating tobacco leaves, grain, flour, vitamins and animal feed for a multiplicity of purposes. As stated above, grain used as animal feed is often treated with steam to improve its digestibility by the animal as well as to improve its food value prior to feeding or pelletizing. This is particularly true of soybeans.

Soybeans are known to contain around 18 to 20% fat or oil. The oil comprises a high cost item that may be sold separately from the soy bean. The by-product of soybean meal that is left after the removal of oil or fat is still rich in protein. For this reason it may be treated by other methods of conditioning for utilization as animal feed. One problem is that animal feed also needs oil and/or fat for proper animal nutrition. For this reason, oil and fat are reintroduced into the soybean meal for preparation of animal feed. The prior art techniques utilizing this preparation include exposing the oil enriched defatted ground soybean to specific time, temperatures and moisture for proper conditioning. Prior art technique utilizes boiler steam which heats and moisturizes the soybean meal prior to introducing the meal to an extruder. In the extruder, the ground and partially conditioned meal is exposed for a brief period of time to extremely high temperatures and pressure. This is somewhat of an expensive step with several disadvantages. Extruding is not the only manner in which such soybean meal can be prepared for animal feed. It has been an accepted technique however due to the fact that the soybean has been previously conditioned for removing the oil therefrom.

Several methods of processing whole beans are available. However, most of the methods that have been developed for commercial use fall into two basic categories. The first, and by far the most common one, is the extruder-type processing. The second is the dry-heat processing. In the extruder type, either whole beans or soybean flour are forced through die holes in an expander extruder. Heat generated from friction, or supplied by externally applied steam, is used to cook the bean to inactivate undesirable components in the beans. These undesirable components include urease and trysin inhibitors. However, the resulting product is physically undesirable and needs additional grinding. This method of processing is usually accompanied by cell rupture, hence the nutrients are normally considered to be "available." For animal feeds, about 20–30% in weight of other carrier grains may have to be added to the soybeans to make the final product manageable. Depending upon the model of extruder-type processing, some drying may be necessary, especially if the material is to be stored prior to use. The second system basically uses dry heat to toast or roast the whole bean. In this system, the whole bean is usually subjected to gas flame for brief intervals to accomplish the cooking. The process does not disrupt the cells and the beans must be ground before mixing into the diet.

Unfortunately, in most expander-extruder type of processing, the feed still needs pelleting in order to increase cell rupture to attain maximum digestibility and absorbability. This extra step is not cost effective. Moreover, the energy cost to run an extruder-type equipment is high. Also, maintenance of this type of equipment is expensive, because the equipment is prone to break down. The second system, namely, the dry-heat processing, is likewise not ideal. The oil from heated ground beans is usually not as well absorbed by an animal as the oil from heated flakes. Most important of all, the desirable chemical reactions do not proceed efficiently under the dry-heat environment. There is also a likelihood of overdenaturing the amino acids and proteins under a dry-heat condition.

An alternative method of processing whole soybeans is boiling or steam cooking in systems similar to that used for batch-type processings of meat scraps. Such commercial equipment, however, has not been designed specifically for soybeans. Other high-cost cooking techniques, such as microwave and infra-red heating techniques, have also been used with varying results.

The actual mechanism whereby unheated soybean meal causes poor fat absorptions and depression in protein digestibility in young chicks and other animals is unknown. However, there are several plausible theories. One is that the trypsin inhibitors stimulate pancreatic hypertrophy and the synthesis of proteolytic enzymes, thus increasing the requirement for amino acids and the ultimate loss of endogenous nitrogen. Another theory is that the undigested protein in raw soybean meal synthesize bile acids and elevate their rate of fecal excretion, thereby depressing fat absorptions. Still another theory is that raw soybeans contain a protein fraction which becomes digestible only after heating.

In general, the degree of improvement on nutritive value is effected by a combination of heat, duration of heating, pressure, and moisture conditions. It has been observed that maximum nutritive value of soybean protein is achieved by treatment with live steam about thirty minutes or by autoclaving at 15 lbs pressure for fifteen to twenty minutes. The improvement in protein efficiency effected by atmospheric steaming at a level of nineteen percent moisture is somewhat higher than at a level of five percent. It is thus clear that the improvement in the nutritive value of soybean protein is related to the destruction of urease, trypsin inhibitors and other biologically active components. And the destruction of the undesirable components is facilitated by a combination effect of heat, moisture, pressure and time.

It has also been documented that excessive amounts of heat may adversely affect the nutritive value of the protein as well as denaturizing amino acids. The damage inflicted by denaturization can usually be overcome by supplementation with lysine and other sulfur-containing amino acids. A reduction of available lysine in overheated commercial soybean meals causes a reduction in efficiency of gains per gram of protein consumed. These deficiencies in overheated soybean meal can be explained by the vulnerability of cystine and lysine to destruction and/or inactivation by heat. Cystine is particularly sensitive to heat. Likewise, lysine not only undergoes destruction when soybean protein is overheated, but much of the lysine is also rendered unavailable. The reason that lysine becomes unavailable is that the amino groups of lysine interact with the reducing groups of sugars. Thus, when soybeans are overheated, the hydrolysis of sucrose may give rise to appreciable levels of reducing sugars which will interact with lysine. Consequently, the peptide bond containing the modified lysine is not susceptible to tryptic cleavage and, hence, no longer physiologically available. The effect is the reduction of the digestibility of soybean protein by pancreatic enzyme. A direct consequence of impaired digestion is the retardation in the rate at which all amino acids are released from the protein during digestion. Since methionine is the limiting amino acid of soybean protein, a delay in digestion leading to an excretion of methionine would only accentuate a deficiency in this amino acid. In addition, a number of other amino acids, including arginine, tryptophan, histidine, and serine are either partially destroyed or inactivated by the excessive heating of soybean meal. Fortunately, some of these amino acids are not limiting in soybean protein, therefore, their partial loss probably does not affect the nutritive properties of the protein.

It is thus clear that new methods and techniques are needed to optimize the conditions under which soybean meal should be cooked to inactive the inhibitors and other undesirable components while at the same time avoid the destruction of critical amino acids. The extent of heating, the duration of heating, the amount of water moisture, pressure and particle size in the processing system must be optimized in relation to one another to obtain maximum nutritive value of soybeans.

It is well known in the prior art to use steam to heat and/or moisturize particulate matter prior to feeding, bagging, flaking or pelletizing. This is particularly true of ground grains and soybeans as described above. As stated, conventional steam conditioning system raises the moisture level and temperature of the mixture which is generally non-homogeneous. Generally, conditioning requires that the particulate matter such as the ground soybeans be mixed with various types of the additives or the oil. Processing full fat soybeans does not require additives, while processing homogeneous conditioning does. Conditioning systems which are capable of providing homogeneous interaction of the ground soy-bean mixture and conditioning steam are relatively new and comprise the subject matter of several of the aforesaid patents assigned to the assignee of the present invention. With these systems and with a properly controlled network, direct fired steam can be utilized to overcome the problems of the prior art.

An important class of naturally occurring substances are carbohydrates. They are found universally distributed among plants, animals, and microorganisms. Carbohydrates are divided into three basic categories: monosaccharides, oligosaccharides and polysaccharides. The monosaccharides usually have three to nine carbon atoms and only one aldehyde or ketone function. The oligosaccharides are oligomers of monosaccharides linked together by glycosidic, or acetal, bonds. Generally, these oligosaccharides contain two to ten monomeric units. The polysaccharides are molecules of great size and are characterized by high degrees of polymerization. Included among polysaccharides are such important substances as glycogen, dextrins, cellulose, and starch. They may be considered as condensation polymers in which the monosaccharides, or their derivatives, are joined together by glycosidic bonds. Because the monosaccharide units of polysaccharides are joined by glycosidic, or acetal, linkages, the polysaccharides are readily hydrolyzed by mineral acids but are resistant to alkaline hydrolysis.

Polysaccharides may be divided into two principal functional groups. The first, which include cellulose, serves principally architectural purposes. The second, which includes glycogen, functions as nutrients. In terms of gross structural features, polysaccharides may also be divided into two groups: homopolysaccharides and heteropolysaccharides. The former is characterized by the repeated occurrence of only one sort of monosaccharides within the molecule, and the latter by the occurrence of two or more types of monomeric units.

One other term for the polysaccharides is the "glycans." It has been suggested that polysaccharides such as starches, glycogen and cellulose, all of which are made up of a single kind of monosaccharide, be called "homoglycans." Those that are made up of two or more kinds of monosaccharides, or their derivatives, are named "heteroglycans." Hence, glucose polysaccharides are sometimes called "glucans," while fructose polysaccharides are "fructans." Polysaccharides made up of mannase and xylose are called "mannans" and "xylans," respectively.

The most abundant structural polysaccharides of plants is cellulose. In fact, it is the most abundant organic substance on earth. Cellulose molecules exist in the cell walls of many plants, not as individual molecules, but in the form of microfibrils that are several angstroms long. These are formed from numerous cellulose chains arranged parallel to one another. The second most abundant organic substance on earth is chitin. It, too, is a polysaccharide that is closely related structurally to cellulose. It performs similar functions, as cellulose, in the lower forms of plant life, particularly the fungi, and in invertebrates, particularly the arthropods. In many species, neither cellulose nor chitin is employed for purposes of cell wall construction and for related architectural functions. Their place is taken by a variety of alternative polysaccharides, including glucans, mannans and xylans.

The cell walls of plants form the skeleton of plants and must be competent to withstand tremendous physical weights. Moreover, plants may experience extremes of environment in terms of osmotic pressure. Finally, the cell wall is the central means of protection against invasion by pathogens.

Cellulose, in the form of microfibrils, accounts for about 20 percent of the weight of the primary cell wall of plants. The remainder is largely composed of other polysaccharides. A little of protein is also present in the cell wall of plants. This protein component contains numerous enzymes. The noncellulose polysaccharides of the primary cell wall are not structured, rather they form an amorphous gel within the interstices of the cellulose matrix. Conversion of primary cell walls into secondary cell walls is accompanied by increased thickness of the wall resulting from additional deposition of cellulose, lignin and others. It is this secondary cell wall which accounts for the ability of plants to withstand substantial physical pressures.

In the preparation of animal feeds from plants, the primary objective is, of course, to increase the nutritional value of the feeds. This objective is accomplished by, firstly, preserving the nutrients in the plants and, secondly, by making the nutrients available, digestible and absorbable by animals. Among the desirable nutrients are starch, peptides, certain amino acids, protein, and oil. Undersirable enzymes and bacteria must be eliminated in the process of preparation lest they interfere with the digestibility and absorbability of the plant nutrients. As discussed above, among the undesirable enzymes are trypsin inhibitors and urease.

Certain grains, such as barley and oats, although high in potential nutritional values for certain ruminant animals, are, nevertheless, not readily digestible by monogastric animals such as chicken and pigs. It has been observed that when these mono-gastric animals, such as chicken, are fed with barley, the animals produce profuse and wet excreta. The growth rate of the animals is hence retarded as compared to those fed with corn or wheat.

One reason for the problem with barley as animal feeds is that, in addition to the protein encapsulation of the starch, the outer part of the endosperm also contains water soluble carbohydrate components, mixed linked 1,3:1,4-beta-glucans ("beta-glucans"). While ruminant animals can digest these beta-glucans, the mono-gastric animals cannot. One possible reason is that the stomach of a ruminant animal has certain microflora that can ferment and digest the water soluble beta-glucans. Accordingly, barley, although high in potential nutritional value, is a poor feed for mono-gastric animals.

Various treatment methods have been used to improve the feed value of barley for poultry. Soaking barley in water appears to activate endogenous beta-glucanases in the barley grains. The enzymes beta-glucanases in turn hydrolyze the beta-glucans. An alternate treatment method is to add beta-glucanase isolated from bacterial or fungal sources to the barley diet. Both methods will enhance the nutritional value of the barley in that the growth rate and feed efficiency of barley are increased. In addition, both treatment methods reduced excreta wetness, volume and weight. Moreover, the digestibility of fat, protein and starch of barley diets was improved by these treatments. Unfortunately, soaking of barley will shorten the shelf half-life of the barley. Also, the beta-glucanases obtained from bacterial or fungal sources are expensive. Hence, both treatment methods are impractical for commercial feeds.

It would be a distinct advantage, therefore, to provide a complete system overcoming all these problems of the prior art by utilizing conditioning systems and direct fired steam generation in an effective and reliable manner. The system of the present invention affords such an operation by utilizing the steam and products of combustion of a direct fired vapor generator in conjunction with a pressurized counterflow conditioning vessel having discharge means disposed therein for uniformly passing particulate matter therethrough. The amount of heat for pasteurizing and/or moisture supplied to the matter may be controlled by the rate of fuel burning of the vapor generator or by pressurization as set forth above. Retention time may be increased by the utilization of a second static steaming or conditioning vessel disposed in flow communication with the first that may also utilize the dynamic influx and counterflow of direct fired steam or merely provide a heat retention area for continued homogeneous conditioning of the ground full fat soy bean. In this manner, a marked advance over the prior art may be made by affording a product by process adapted for immediate consumption by livestock with maximum digestibility and nutrition.

The present invention creates a combination of conditions having specific ranges of temperature, moisture, acidity and oxygen. This resultant conditions eliminate trypsin inhibitors and urease, the two undesirable enzymes. Moreover, these conditions will also partially denature cellulose and protein contained in the endosperm around starch granules so that the starch granules can be exposed and made available to animals' digestive systems.

Surprisingly, the present invention produces a combination of temperature, pressure, moisture, acidity and low oxygen content that was found to be effective in denaturing or insolubilizing water soluble beta-glucans in barley. Although the precise mechanism is not known, the result was that barley feeds produced by the present invention had lower amount of water soluble beta-glucans and hence were less harmful to monogastric animals, such as chicken.

Although the presence of water soluble beta-glucans in barley may decrease the feed value of feeds for monogastric animals, the presence of these beta-glucans, however, may have hypocholesterolemic effects in several species, including man. Thus, it has been shown that chicks fed with barley containing beta-glucans have lower levels of low density lipoprotein cholesterol than the controls which were fed with either corn or barley having the beta-glucans removed or hydrolyzed. Concomitantly, chicks fed with barley containing beta-glucans have higher levels of high density lipoprotein cholesterol than those fed with either corn or barley containing low levels of beta-glucans.

Thus, depending on the intended use of the end product, the presence of beta-glucans in barley can be either desirable or undesirable. It would be advantageous, therefore, to have a conditioning system that, by altering one or various parameters, would condition the barley yet either would denature or insolubilize the beta-glucans or would leave most of the beta-glucans intact.

The present invention affords such a desirable capacity. Either singly or in combination, specific ranges of temperature, pressure, moisture, acidity and oxygen can be controlled and manipulated in the conditioning system. The resultant conditions can be manipulated toward the goal of either denaturing, insolubilizing or leaving intact beta-glucans in barley, depending whether or not the beta-glucans are needed in the end products.

SUMMARY OF THE INVENTION

The present invention pertains to a high pressure conditioning system utilizing direct fired steam. More particularly, one aspect of the invention includes an improved conditioning system of the type wherein a first conditioning vessel is adapted for the flow of matter, such as soybean, barley, or seeds to be conditioned therethrough and means for injection of a treatment fluid therein. The improvement comprises a direct fired steam generator adapted for producing a mixture of super-heated steam and oxygen-deficient non-condensables which is used both dynamically and statically. The mixture is introduced into the vessel for dynamic pressurized counter-current flow relative to the matter passing therethrough. Then the matter is steamed statically in a resting chamber. Under such conditions, a myriad of desirable changes occur to enhance the nutritive value of the feed produced. These changes include partial denaturization of protein, reduction of harmful enzymes and microorganism, and destruction or altering of certain polysaccharides encapsulating the starch in the grains.

BRIEF DESCRIPTION OF THE DRAWINGS

For a more complete understanding of the present invention and for further objects and advantages thereof, reference may now be had to the following description taken in conjunction with the accompanying drawings in which:

FIG. 2 is a table of test results on full fat soybeans conditioned, both dynamically and statically, in accordance with the principles of the present invention.

FIG. 3 is a table of comparative digestibility and urease indices of commercial soybean meal and soybean meal produced in accordance with the principles of the present invention.

FIG. 4 is a table of test results on barley showing the amount of soluble beta-glucans in the treated and the raw samples.

DETAILED DESCRIPTION

Figure 1:
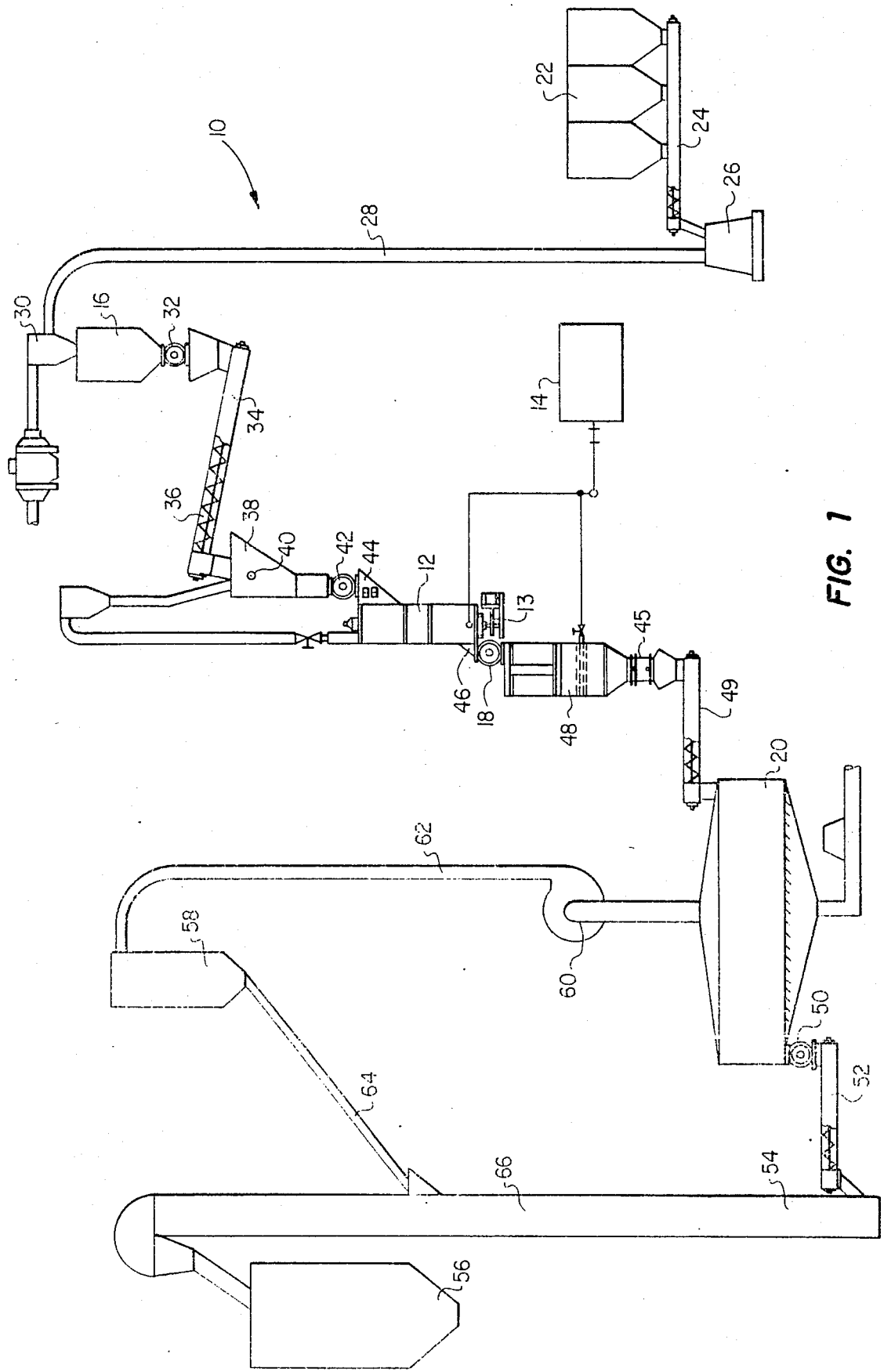
FIG. 1 is a diagrammatic, schematic representation of a high pressure conditioning system constructed in accordance with the principles of the present convention.

Referring first to FIG. 1 there is shown a diagrammatic, schematic representation of a high pressure conditioning system 10 constructed in accordance with the principles of the present invention. This system 10 comprises a dynamic conditioning vessel 12 and direct fired steam generator 14 coupled thereto. One direct fired steam generator that can be utilized here has been described in U.S. Pat. Nos. 4,667,418 and 4,731,938 assigned to the assignee of the present invention and incorporated herein by reference. The generator generates a mixture of super-heated steam and oxygen-deficient non-condensable gases. "Oxygen-deficient" gases used here denotes that the oxygen content is less than about 15% by volume. Matter to be conditioned is first placed in a bin 16 thereabove. The matter to be conditioned include beans, grains, cereals, and seeds. The term beans includes whole beans, bean fractions, screenings and bean splits. Thus the present invention includes full fat soya processing. The term grains includes barley, wheat, oats, rye, sorghum, rice and others. The term "seeds" includes rape seeds among others. The conditioned and steamed material is discharged through an outlet airlock feeder 18 therebelow. A horizontal dryer 20 is shown disposed beneath the static resting chamber 48 for purposes of drying the conditioned matter. Evaporation of moisture from the finished product will also simultaneously cool the product. It may, depending on the season of the year, be necessary to preheat the air that is used to dry the finished product. Hence, the combination of drying and cooling can be accomplished in a separate room. This system is provided with a network of controls enabling the rate of discharge to be both monitored and managed in conjunction with parameter sensors disposed within the system. In this manner full fat feed may be efficiently conditioned for effective animal digestion.

Still referring to FIG. 1 the matter to be conditioned is first stored in grain bin 22 disposed atop feeder 24. The matter goes through a hammer mill 26 and then passes through a screen with circular openings of about ⅛ inch with negative air. The ground particles are then fed upwardly to bin 16 through a positive air transfer 28. A separator 30 prevents blow-off of milled grain prior to entry into bin 16. An airlock 32 is disposed therebeneath for discharge into feeder 34. At this point the system 10 can be pressurized as will be defined in more detail below.

Referring still to FIG. 1, the feeder 34 is constructed with a conventional auger assembly 36, or the like, for carrying the ground matter into a surge bin 38. Within the surge bin 38 a bindicator 40 is disposed for indicating the level therein. A valving device, such as an inlet airlock feeder 42, is disposed beneath the surge bin for main discharge into the conditioning vessel 12 through input port 44. A discharge to 46 is disposed at the lower end of the conditioning vessel 12 and above a second valving device, such as a pocket valve 18. The valving device is needed for the ingress of particles of matter to be conditioned while preventing the exhaust of steam, gases, and pressure in the vessel 12. The vessel 12 is disposed generally in a vertical configuration and the mixture of super heated steam and oxygen-deficient non-condensable gases under elevated pressure is disposed in a lower region of the vessel and travel upwardly in a counter current flow relative to the passing therethrough of the matter. Vessel 12 is also provided with a notatably mounted mixer 13 with a plurality of paddles secured to the rotor to homogeneously mix the contents in vessel 12. The operation of the conditioning of the matter also has been described in U.S. Pat. Nos. 4,667,418 and 4,731,938, both assigned to the assignee of the present invention and incorporated herein by reference. The conditioned matter that has egressed from vessel 12 is allowed to statically steam "rest," "ripen," or "steep" in this resting chamber 48. The resting chamber 48 is insulated to prevent heat loss, and, further, it is designed to be pressurized. The direct fired steam generator 14 is also coupled to chamber 48 to provide a mixture of super heated steam and oxygen-deficient non-condensable gases to the chamber 48. Thus, the temperature and the pressure inside the chamber 48 can be maintained at elevated levels to aid the steaming of the conditioned matter. A third valving device, such as "Garner Gates" 45, is interposed between resting chamber 48 and the discharge 49 leading to dryer 20. The technology of Garner Gates has previously been set forth in a U.S. Pat. No. 4,817,518 also assigned to the assignee of the present invention and incorporated herein by reference. The Garner Gates 45 will create interrupted flow to prevent coring of matter when the matter is unloaded through discharge 49 to dryer 20. Moreover, Garner Gates 45 will allow the egress of steamed matter while preventing the exhaust of steam, gases and pressure therefrom. A lower discharge tube 49 carries the matter from the outlet of chamber 48 into the horizontal dryer 20. As shown herein, the cooler 20 may comprise of twin screw horizontal dryer.

When the conditioned and steamed matter is being dried, the evaporation of the moisture will cool the matter simultaneously. When needed, a two-path dryer cooler is used (not shown in the drawing). Here, there is a capability to pre-heat air in the first path to dry the matter, while air at ambient temperature in the second path is used to cool the matter. Once the matter has been cooled, it is discharged through the dryer airlock 50 into feeder 52. From feeder 52 the cooled conditioned matter is fed into an elevator 54 for deposit into finished feed bin 56. A cyclone 58 is provided adjacent the elevator 54 for receiving grain particles that have been carried upwardly by the fan system 60 as utilized to further effectuate the cooling process within the dryer 20. Passage 62 thus carries the matter as particles into the cyclone 58 whereby passage 64 then discharges these particles into an upper region 66 of the elevator 54. In this manner, all conditioned matter is effectively contained within the system 10 for effective utilization of energy and resources provided herewith.

Relative to the matter conditioned and steamed within the system 10, several technical aspects should be discussed. It is well known in the prior art that the primary product of the soybean is the oil. Since the oil sells for a very high price, the meal is the by-product. In the course of extracting the fat or the oil from the soybean, most prior art systems utilize a solvent such as hexane. This solvent is both expensive and hazardous although it can be recovered. It is recovered in the gas stream during the oil removal process. Unfortunately the meal in the form of flakes is saturated with hexane. One method of removing the residual hexane is to heat the meal to vaporize the hexane. The "de-hexaned" meal is then cooked or toasted with raw steam to some degree within prior art systems to satisfy the previously established nutritional qualities thought to be generated thereby. Unfortunately as expressed in the aforesaid references, there are many unknowns in cooking organic and inorganic material.

The proper cooking of soybeans has not been given sufficient attention within most prior art systems. There has been a great deal of interest in the possibility of utilizing whole unextracted or "full-fat" soybeans in animal and poultry diets. Whole soybeans not only contain high quality protein (38–42%) but also is a rich source of energy due to the oil which they contain (18–22%), they have the potential of supplying major quantities of both energy and protein for all types of animal and poultry feeds. Other advantages that have been attributed to the full-fat bean are: (1) it is a granular material that can be handled at a lower cost than fat in the feed mixing operation; (2) having the fat within the matrix of the feed particle, rather than having fat sprayed on the surface, may permit higher fat content feeds to be made into satisfactory pellets; and (3) the quality of soybean fat is higher than that obtained from most sources of added fat. Consequently, soybean meal is the major protein supplement in practical animal and poultry diets. It makes up about twenty-five percent (25%) or more of a complete practical poultry ration. Compared to other plant-source proteins, soybean meal is particularly high in lysine, an essential amino acid. Moreover, birds fed the diets with whole soybeans have higher levels of unsaturated fatty acids that are characteristic of soybean oil. As has been well documented, unsaturated fatty acids are better than saturated fatty acids for human cardiovascular systems.

As stated above, soybeans must be heated to destroy undesirable components in the beans, such as urease and proteinase inhibitors, examples of which are soybean trypsin inhibitors. Proteinase as used here refers to proteolytic enzymes. It has been found that the nutritive value of soybeans increases with the increased destruction of urease and trypsin inhibitors.

Fortunately, most plant urease and proteinase inhibitors can be inactivated by heat. Thus, for example, at 100° C., only fifteen minutes of steaming is required to achieve maximum protein efficiency and to inactivate the urease and trypsin inhibitor of either full-fat or defatted flakes of soybeans. Urease and trypsin-inhibitor activity of whole soybeans is also readily destroyed by atmospheric steaming for only twenty minutes, provided the beans are tempered to about 25% moisture before steaming. At lower moisture levels, more time or higher temperature are required to inactivate the soybean urease and trypsin inhibitors. When the moisture content of whole soybeans is raised to sixty percent or more by overnight soaking, boiling for only five minutes is sufficient to inactivate the inhibitor. Trypsin-inhibiting activity is destroyed at about the same rate as urease under similar cooking conditions.

Nutritive value as used herein denotes the ability of soy products to supply amino acids and other essential nutrients. As indicated above, partial heating of soybean increases the nutritive value of the soybean itself. Many reports have indicated that the toxicity of soybean hemagglutinin is also destroyed by moist heat treatment. Raw soy flour contains about three percent hemagglutinin. Soybean hemagglutinin is not only toxic to animal, but is also responsible for about fifty percent of the growth inhibition of animals fed with raw soybean meal. Thus, the processing of soybean not only removes the unwanted enzymes, enzyme inhibitors, but also decreases the toxicity of the soybean. Other anti-nutrients in soybeans that are also inactivated or removed by heat include goitrogens, rachitogenic factors and anti-vitamins. Goitrogens are responsible for thyroid enlargement and goitrogenicity may be related to the poor nutritional state of animal fed with raw soybean meal. Rachitogenic factors in raw soybean meals have been associated with the development of rickets.

Referring now to FIG. 2, there is shown a table of data on full fat soybean conditioned and steamed in accordance with the present invention. The data were generated from analyses performed by two separate independent laboratories in this country. The soybeans were first ground in a hammermill and passed through a screen with round perforations of about ⅛ inch with negative air. It is essential to have ground particles of fineness, consistency and uniformities. It was found that the quality of grind directly correlated with the time, pressure, and moisture required to reduce urease activity, hence increasing the nutritive value of the full fat soy. In the runs referred to in this table, about 2% by weight of moisture was added to the full fat soybean flour before the flour was introduced into the conditioning vessel. In this dynamic conditioning vessel, a mixture of super heated steam and oxygen-deficient non-condensable gases (less than about 5% of oxygen gas by volume) was introduced into the vessel for counter-current flow relative to moisturized full fat soybean flour. The mixture of steam and oxygen-deficient non-condensable gases was generated by a direct fired steam generator as described in U.S. Pat. Nos. 4,667,418 and 4,731,938, assigned to the assignee of the present invention and incorporated herein by reference. The mixture of full fat soybean flour and added moisture was homogeneously mixed and conditioned at about 100° C. and about 1.5 atmospheric pressure in the dynamic conditioning vessel for about 5 minutes. The mixture was then introduced into a resting chamber where the mixture was statically steamed, aged, or steeped under similar conditions for about 12 minutes. The operation of the static steaming was less costly than the conditioning under similar conditions in a dynamic conditioning vessel, yet the static steaming promotes the processing and conditioning of the soybean flour. As compared to untreated whole soybeans or untreated ground soybeans, the meal product obtained by the present invention retained about the same amount of fat, protein, and pepsin digestibility. Most importantly, the urease activity as reflected by the urease index, determined by the increase in pH, of the final product had decreased dramatically, by about 20 folds, as compared to the untreated control. As discussed above, urease activity, which somewhat parallels the activity of trypsin inhibitor, is an indicator of the nutritive value of soybeans. The lower the urease activity, the higher the nutritive value of soybeans. Clearly the present invention has achieved its intended purpose of increasing the nutritive value of full fat soybeans.

Referring now to FIG. 3. It is seen from this table that the urease activities of the meals obtained from the present invention and of commercial meals were about 35 to 40 folds lower than the activity of the untreated ground raw soybean. It is shown that full fat soybean meals prepared by the present invention were comparable to commercial soybean meals prepared by other typical commercial methods which are much costlier as compared to the method of the present invention. The present invention is economic to run not only because of low energy cost but also because of the large amount of meals that can be produced in a given amount of time. The net production cost of the present invention is lower.

The amount of bound moisture in the raw soybeans directly correlates to the moisture required to destruct urease. Moisture is needed not only to conduct heat to the center of soy particles but also to solvate the urease and other undesirable components. Both the transfer of the heat and the solvation of urease are probably essential in the elimination of urease and other undesirable components. As discussed above, it has been reported that at low moisture levels, more time or higher temperature are required to inactivate the soybean urease. Thus, it has been generally held in the prior art literature that when soybeans have been tempered to about 25% moisture content before steaming, about 20 minutes of atmospheric steaming is required to destroy the urease.

Still referring to FIG. 3, it is seen that the moisture content of the soybean meals obtained directly from the dynamic conditioning and static steaming had a moisture content of about 14.64%. The meals had not been further dried and cooled. This number is significant in that a total of about 17 minutes of processing according to the present invention with a moisture content of about 14.64% was sufficient to cause an almost total destruction of urease. This indicates that the present invention can inactivate urease with relatively low moisture contents in relatively short duration of time. Thus the present invention lowers the cost of full fat soya processing in that the steaming time is reduced and also that not as much further drying of the meals is required.

Referring now to FIG. 4, there is shown a table of data on barley treated and conditioned in a dynamic vessel maintained under about 1.5 atmospheric pressure and 100° C. for about 7 minutes. It is seen that as compared to raw barley, the availability of the starch had not changed much in the barley treated and conditioned. Significantly, however, is the fact that the amount of water soluble beta-glucans in the treated barley had decreased to about half of that of the control. As discussed above, one reason that raw barley has low nutritive value as animal feed is that the barley contains water soluble beta-glucans. Here, the barley treated had significantly lower amount of soluble beta-glucans as compared to the untreated raw barley. The same reduction of water soluble beta-glucans can be accomplished by a shorter duration of dynamic condition, such as 3 to 5 minutes, provided the conditioned barley is then steamed in a static resting chamber for a period of about 3 to 10 minutes.

It is thus believed that the operation and construction of the present invention will be apparent from the foregoing description. While the process, method, and apparatus shown and described have been characterized as being preferred, it will be obvious that various changes and modifications may be made therein without departing from the spirit and scope of the invention as defined in the following claims.

What is claimed is:

1. An improved system adapted for high pressure conditioning of matter comprising:
    (a) a direct fired steam generator for producing a treatment fluid comprising a mixture of steam and oxygen-deficient, non-condensable gases to be introduced into a conditioning vessel for counter-current flow relative to matter passing therethrough;
    (b) means for controlling the amount of said mixture of steam and oxygen-deficient, non-condensable gases introduced into said vessel;
    (c) means for controlling the temperature of said mixture of steam and oxygen-deficient non-condensable gases introduced into said vessel;
    (d) means for pressurizing said vessel;
    (e) means for controlling the pressure generated in said vessel;
    (f) at least one first valving device disposed in said vessel for the ingress of said matter passing therethrough while preventing the exhaust of steam, gases, and pressure therefrom:

(g) at least one second valving device disposed in said vessel for the egress of said matter having passed therethrough while preventing the exhaust of steam, gases, and pressure therefrom;

(h) a resting chamber to steam said matter egressed from said vessel;

(i) means for pressurizing said chamber;

(j) means for controlling the pressure generated in said chamber;

(k) at least one third valving device disposed in said chamber for the egress of said steamed matter while preventing the exhaust of steam, gases and pressure therefrom; and (l) a dryer to dry said steamed matter egressed from said resting chamber.

2. The conditioning system as defined in claim 1 wherein said matter is comprised of grains adapted for animal feed.

3. The conditioning system as defined in claim 1 wherein said matter is comprised of grains adapted for human consumption.

4. The conditioning system as defined in claim 1 wherein said matter is comprised of beans.

5. The conditioning system as defined in claim 4 wherein said beans comprise full-fat bean.

6. The conditioning system as defined in claim 1 wherein said matter is comprised of seeds.

7. The conditioning system as defined in claim 1 wherein said vessel is disposed in a generally vertical configuration and said means for introducing said mixture of steam and oxygen-deficient non-condensable gases from said direct fired steam generator includes a diffuser disposed in a lower region of said generally vertically disposed vessel for discharging said mixture of steam and oxygen-deficient non-condensable gases upwardly in counter-current flow relative to said matter passing therethrough.

8. The conditioning system as defined in claim 7 wherein said means for controlling the operation of said direct fire steam generator includes means for determining the oxygen level of non-condensable gases produced by said direct fired steam generator and means for adjusting the combustion of said direct fire steam generator to produce oxygen-deficient non-condensable gases.

9. The conditioning system as defined in claim 1 wherein said oxygen-deficient non-condensable gases contain less than about 15% oxygen by volume.

10. The conditioning system as defined in claim 1 further includes means for permitting the controlled exhaust of non-condensable gases from said vessel comprising a venting orifice whereby said non-condensable gases are exhausted from said vessel after passing through said matter therein.

11. The conditioning system as defined in claim 1 further includes means for mixing said matter passing through said vessel with said mixture of steam and oxygen-deficient non-condensable gases for imparting a homogeneous interaction therebetween.

12. The conditioning system as defined in claim 11 wherein said vessel comprises a generally vertically oriented tank adapted for receiving said matter at an upper end thereof, and discharging said matter from a lower region thereof and wherein said mixer means comprises a rotatably mounted mixer within said vessel, a plurality of paddles secured to said rotor and means for rotating said mixer to impart homogeneous mixing within said vessel.

13. An improved system adapted for high pressure conditioning of matter, said system comprising:

(a) a direct fired steam generator for producing a treatment fluid comprising a mixture of oxygen-deficient non-condensable gases to be introduced into a conditioning vessel for counter-current flow relative to matter passing therethrough;

(b) means for adjusting the combustion of said direct fired steam generator to produce a sufficiently large volume of a mixture of steam and oxygen-deficient non-condensable gases for purging said matter of other gases flowing therewith and maintaining the oxygen-deficient level in said non-condensable gases for creating an anaerobic condition in said vessel;

(c) means for controlling the temperature of said mixture of steam and oxygen-deficient non-condensable gases introduced into said vessel;

(d) means for introducing said mixture of steam and oxygen-deficient non-condensable gases from said direct fired steam generator into said vessel for counter-current flow relative to said matter passing therethrough;

(e) means for pressurizing the vessel;

(f) means for permitting the exhaust of said non-condensable gases from said vessel;

(g) means for steaming said matter egressed from said vessel; and (h) means for drying said steamed matter egressed from said steaming means.

14. The conditioning system as defined in claim 12 wherein said matter is comprised of grains adapted for animal feed.

15. The conditioning system as defined in claim 12 wherein said matter is comprised of grains adapted for human consumption.

16. The conditioning system as defined in claim 13 wherein said matter is comprised of beans.

17. The conditioning system as defined in claim 16 wherein said beans comprise full-fat beans.

18. The conditioning system as defined in claim 13 wherein said matter is comprised of seeds.

19. An improved process of conditioning matter comprising the steps of (a) grinding said matter into small particles;

(b) introducing said particles into a conditioning vessel;

(c) introducing a mixture of steam and oxygen-deficient non-condensable gases into said vessel in a counter-current flow relative to said particles passing therethrough;

(d) introducing said mixture of steam and oxygen-deficient gases into said vessel in sufficient volume and with a sufficient enthalpy for purging said vessel of all other oxygen-laden gases;

(e) pressurizing said vessel to a pressure above atmospheric pressure;

(f) providing means for imparting homogeneous interaction between said particles and said mixture of steam and oxygen-deficient non-condensable gases within said vessel;

(g) steaming, in a resting chamber, said particles having passed through, and having egressed from, said vessel; and (h) drying said steamed particles egressed from said resting chamber.

20. A process as defined in claim 19 wherein said particles can pass through a screen with round perforations of about ⅛ inch.

21. A process as defined in claim 19 wherein the temperature in said conditioning vessel is kept in a range of about 80° to about 150° C., while maintaining the internal pressure of said vessel in the range of about 1.1 to about 2.2 times atmospheric pressure.

22. A process as defined in claim 19 wherein the homogeneous interaction between said particles and said mixture of steam and oxygen-deficient non-condensable gases within said vessel is achieved within a period of about 2 to about 20 minutes.

23. A process as defined in claim 19 wherein the moisture content of said particles having passed through said vessel is maintained from about 5% to about 40% by weight.

24. A process as defined in claim 19 wherein ripening in said resting chamber is achieved by resting for a period of about 5 to about 30 minutes.

25. A process as defined in claim 19 wherein the temperature of said resting chamber is maintained in a range from about 70° to about 150° C.

26. A process as defined in claim 19 wherein said resting chamber is maintained at a pressure higher than atmospheric pressure.

27. A process as defined in claim 26 wherein said pressure is in the range of about 1.1 to about 2.2 atmospheric pressure.

28. A process as defined in claim 19 wherein the drying of said steamed particles are achieved by flowing a second gaseous material therethrough.

29. A process as defined in claim 28 wherein said second gaseous material comprises air.

30. A process as defined in claim 29 wherein said air is preheated to above ambient temperature.

31. A process as defined in claim 19 wherein said matter is comprised of grains.

32. A process as defined in claim 19 wherein said gases contain less than about 15% of oxygen by volume.

33. A product produced by the process of claim 19.

34. Full-fat soybean product produced by the process of claim 19.

35. Barley product produced by the process of claim 19.

36. Seed product produced by the process of claim 19.

* * * * *